United States Patent
Mudric

(10) Patent No.: US 10,728,207 B2
(45) Date of Patent: Jul. 28, 2020

(54) INTERNET PROTOCOL ADDRESS SELECTION IN SESSION INITIATION PROTOCOL COMMUNICATIONS

(71) Applicant: Avaya Inc., Basking Ridge, NJ (US)

(72) Inventor: Dusan Mudric, Ottawa (CA)

(73) Assignee: Avaya, Inc., Basking Ridge, NJ (US)

( * ) Notice: Subject to any disclaimer, the term of this patent is extended or adjusted under 35 U.S.C. 154(b) by 171 days.

(21) Appl. No.: 15/677,517

(22) Filed: Aug. 15, 2017

(65) Prior Publication Data
US 2019/0058688 A1 Feb. 21, 2019

(51) Int. Cl.
*H04L 29/12* (2006.01)
*H04L 29/06* (2006.01)
*H04L 12/741* (2013.01)
*H04L 12/911* (2013.01)

(52) U.S. Cl.
CPC .......... *H04L 61/2007* (2013.01); *H04L 45/74* (2013.01); *H04L 47/74* (2013.01); *H04L 61/1529* (2013.01); *H04L 65/105* (2013.01); *H04L 65/1006* (2013.01); *H04L 65/1069* (2013.01); *H04L 61/6086* (2013.01)

(58) Field of Classification Search
CPC ...................... H04L 29/06027; H04L 61/2007
See application file for complete search history.

(56) References Cited

U.S. PATENT DOCUMENTS

| | | | |
|---|---|---|---|
| 2007/0171907 A1* | 7/2007 | Mansutti | H04L 29/06027 370/389 |
| 2014/0313881 A1* | 10/2014 | Limaye | H04L 45/28 370/219 |
| 2015/0032906 A1* | 1/2015 | Kweon | H04L 61/2007 709/245 |

* cited by examiner

*Primary Examiner* — Philip J Chea
*Assistant Examiner* — Mohammed Ahmed

(57) ABSTRACT

Examples disclosed herein provide methods and systems for selecting Internet Protocol addresses for Session Initiation Protocol (SIP) communications. In at least one implementation, a method of operating a communication network utilizing a session initiation protocol (SIP) is provided. The method performed within a second communication device includes receiving a SIP invite from a first communication device, and determining a source IP address for the second communication device, using an IP address for a third communication device as a destination address within a source address selection algorithm (SASA) function. The method further includes adding a Via header within the SIP invite to include the SASA determined source IP address for the second communication device, adding a Record-Route header within the SIP invite to include the SASA determined source IP address for the second communication device, and transferring the modified SIP invite to the third communication device.

20 Claims, 16 Drawing Sheets

Answerer/UD2
7002@corp.com
169.254.234.69
[2000::200]
(IPv4/IPv6)
260

Dialog State:
Local URI = sip:7002@corp.com
Remote URI = sip:7001@corp.com
Remote Target = 7001@169.254.234.68
Route Set =
<sip: 69.254.234.101:5060:lr,transport=tcp>
<sip: [2000::101]:5060:lr,transport=tcp>
<sip: [3000::100]:5060:lr,transport=tcp>
<sip: 69.254.234.100:5060:lr,transport=tcp>

(Prior Art)
FIGURE 2B

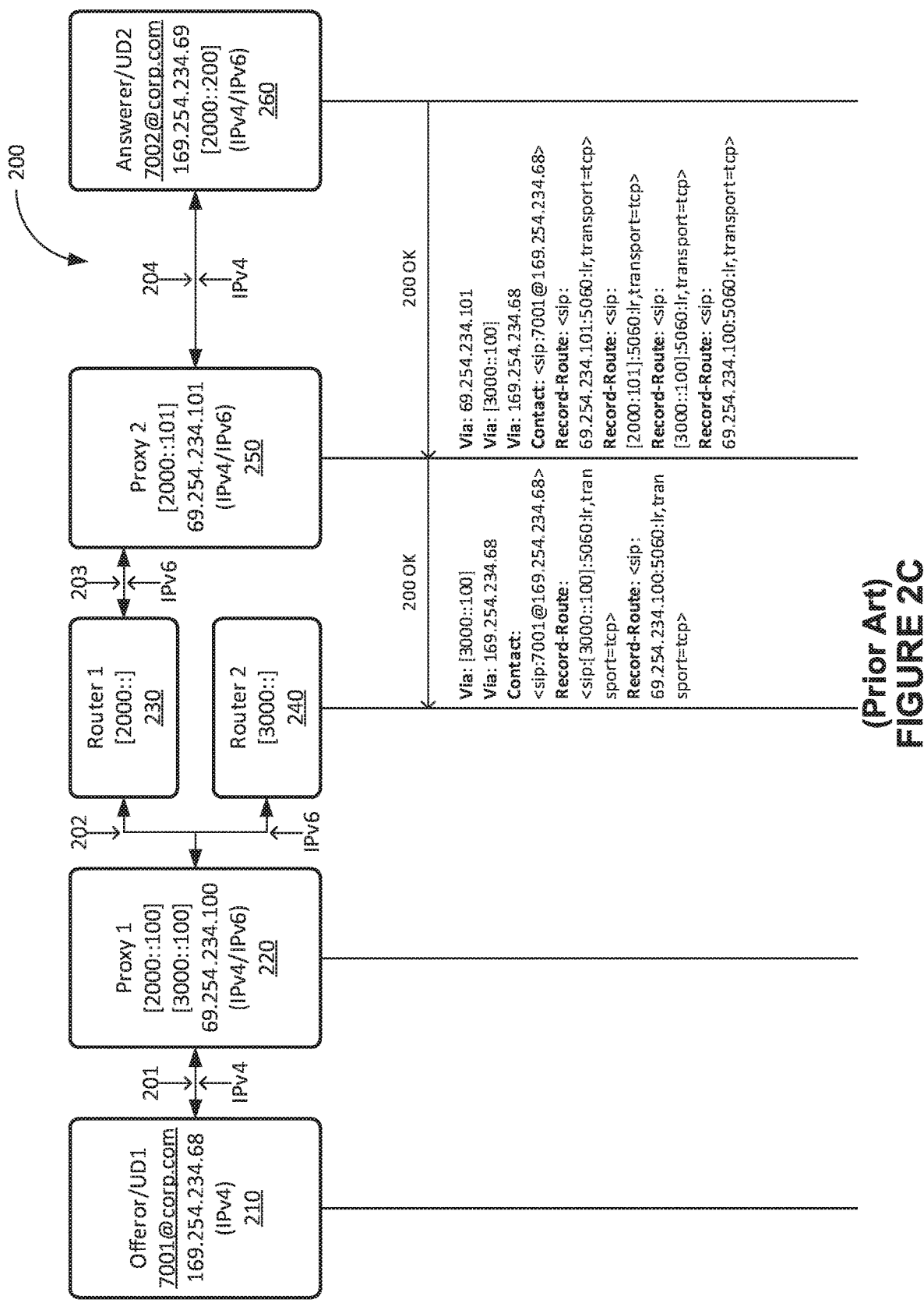
(Prior Art) FIGURE 2C

Answerer/UD2
7002@corp.com
169.254.234.69
[2000::200]
(IPv4/IPv6)
360

Dialog State:
Local URI = sip:7002@corp.com
Remote URI = sip:7001@corp.com
Remote Target = 7001@169.254.234.68
Route Set =
<sip: 69.254.234.101:5060:lr,transport=tcp>
<sip: [2000::101]:5060:lr,transport=tcp>
<sip: [3000::100]:5060:lr,transport=tcp>
<sip: 69.254.234.100:5060:lr,transport=tcp>

(Prior Art)
FIGURE 3B

Offeror/UD1
7001@corp.com
169.254.234.68
(IPv4)
310

Dialog State:
Local URI = sip:7001@corp.com
Remote URI = sip:7002@corp.com
Remote Target = 7002@[2000::200]
Route Set =
<sip: 69.254.234.100:5060:lr,transport=tcp>
<sip: [3000::100]:5060:lr,transport=tcp>
<sip: [2000::101]:5060:lr,transport=tcp>
<sip: 69.254.234.101:5060:lr,transport=tcp>

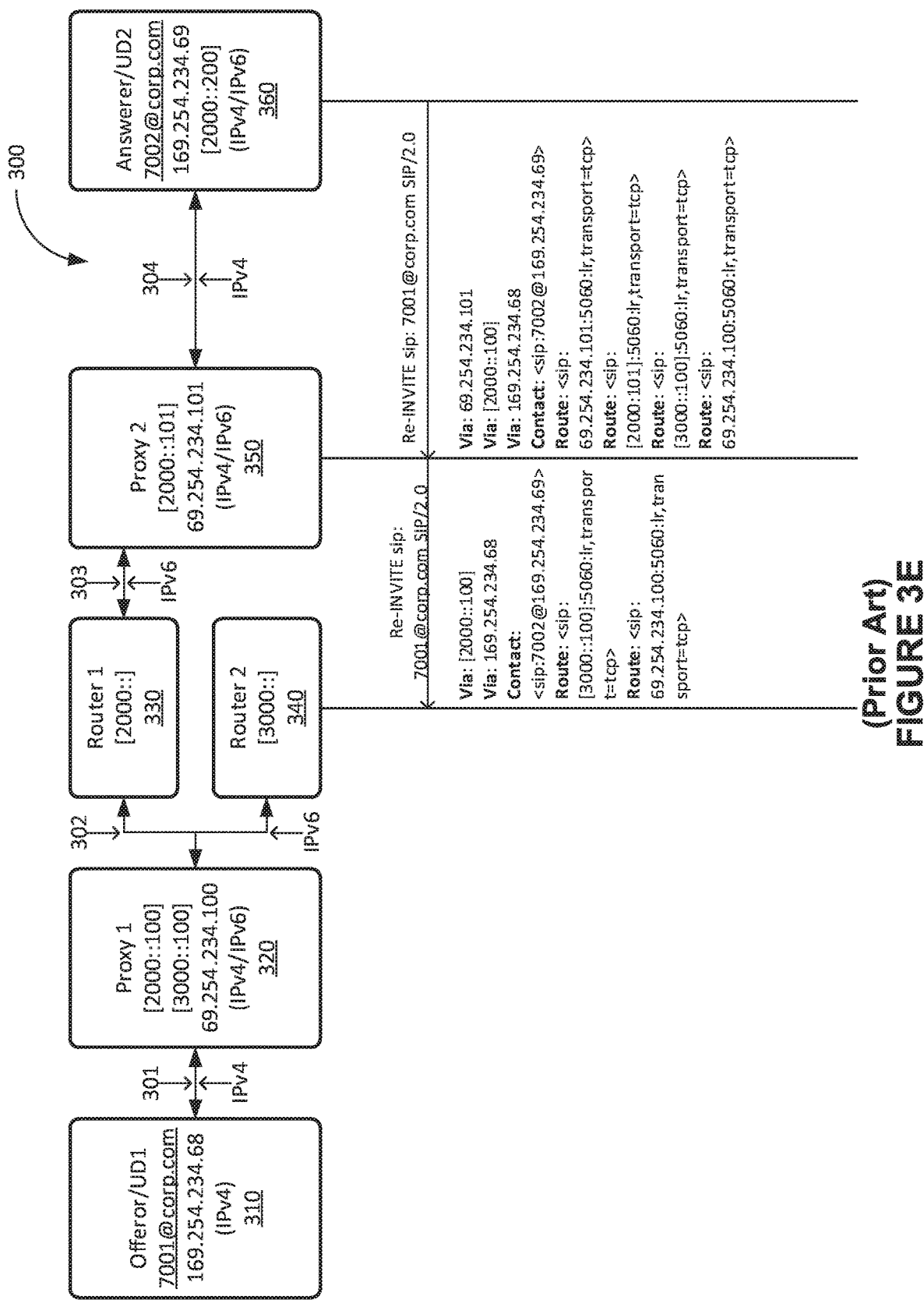
(Prior Art) FIGURE 3E

Answerer/UD2
7002@corp.com
169.254.234.69
[2000::200]
(IPv4/IPv6)
460

Dialog State:
Local URI = sip:7002@corp.com
Remote URI = sip:7001@corp.com
Remote Target = 7001@169.254.234.68
Route Set =
<sip: 69.254.234.101:5060:lr,transport=tcp>
<sip: [2000::101]:5060:lr,transport=tcp>
<sip: [2000::100]:5060:lr,transport=tcp>
<sip: 69.254.234.100:5060:lr,transport=tcp>

FIGURE 4B

Offeror/UD1
7001@corp.com
169.254.234.68
(IPv4)
410

Dialog State:
Local URI = sip:7001@corp.com
Remote URI = sip:7002@corp.com
Remote Target = 7002@[2000::200]
Route Set =
<sip: 69.254.234.100:5060:lr,transport=tcp>
<sip: [2000::100]:5060:lr,transport=tcp>
<sip: [2000::101]:5060:lr,transport=tcp>
<sip: 69.254.234.101:5060:lr,transport=tcp>

INTERNET PROTOCOL ADDRESS SELECTION IN SESSION INITIATION PROTOCOL COMMUNICATIONS

TECHNICAL BACKGROUND

Session Initiation Protocol (SIP) is a communications protocol for signaling and controlling multimedia communication sessions. These communication sessions may include internet telephony for voice calls and video calls, as well as instant messaging over internet protocol (IP) networks. In many communications system proxy servers (session management servers) may include multiple IP interfaces. These interfaces may be mixed combinations of Internet Protocol version 4 (IPv4) interfaces and Internet Protocol version 6 (IPv6) interfaces, or dual mode (IPv4/IPv6) interfaces.

IPv4 interfaces require different IP addresses for each interface, while IPv6 allows for the assignment of multiple IP addresses per interface. Dual mode interfaces allow assignment of both IPv4 and IPv6 addresses to the interface. Any interface can be a dual mode interface. When communications traverse both IPv4 and IPv6 interfaces and links, addressing of the communications becomes critical and difficult. Also, it may be difficult to setup and configure communications due to firewalls, routers, and other mechanisms of a network that block communications between particular IP addresses.

OVERVIEW

Examples disclosed herein provide systems, methods, and computer readable media to enhance address selection in session initiation protocol (SIP) communications. In one implementation, a method of operating a communication network utilizing a session initiation protocol (SIP) is provided. The method performed within a second communication device includes receiving a SIP invite from a first communication device, and determining a source IP address for the second communication device, using an IP address for a third communication device as a destination address within a source address selection algorithm (SASA) function. The method further includes adding a Via header within the SIP invite to include the SASA determined source IP address for the second communication device, adding a Record-Route header within the SIP invite to include the SASA determined source IP address for the second communication device, and transferring the modified SIP invite to the third communication device.

In one implementation, a computing apparatus includes one or more non-transitory computer readable storage media and a processing system operatively coupled with the one or more non-transitory computer readable storage media. The computing apparatus further includes program instructions stored on the one or more non-transitory computer readable media to operate an end user communication device assigned a plurality of IP addresses that, when executed by the processing system, direct the processing system to, receive a SIP invite from a first communication device, and to determine a source IP address for the computing apparatus, using an IP address for a second communication device as a destination address within a source address selection algorithm (SASA) function.

The program instructions further direct the processing system to add a Via header within the SIP invite to include the SASA determined source IP address for the computing apparatus, to add a Record-Route header within the SIP invite to include the SASA determined source IP address for the computing apparatus, and to transfer the modified SIP invite to the second communication device.

In another implementation, a communication system for operating a communication network utilizing a session initiation protocol (SIP) is provided. The communication system includes a first communication device, and a second communication device, coupled with the first communication device. The second communication device is configured to receive a SIP invite from a first communication device, and to determine a source IP address for the second communication device, using an IP address for a third communication device as a destination address within a source address selection algorithm (SASA) function.

The second communication device is further configured to add a Via header within the SIP invite to include the SASA determined source IP address for the second communication device, to add a Record-Route header within the SIP invite to include the SASA selected source IP address for the second communication device, and to transfer the modified SIP invite to the third communication device.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 2A-2C illustrate prior art timing diagrams of a method of operating a communication system for SIP communication according to one implementation.

FIGS. 3A-3E illustrate prior art timing diagrams of a method of operating a communication system for SIP communication according to one implementation.

FIGS. 4A-4E illustrate timing diagrams of a method of operating a communication system for SIP communication according to one implementation.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
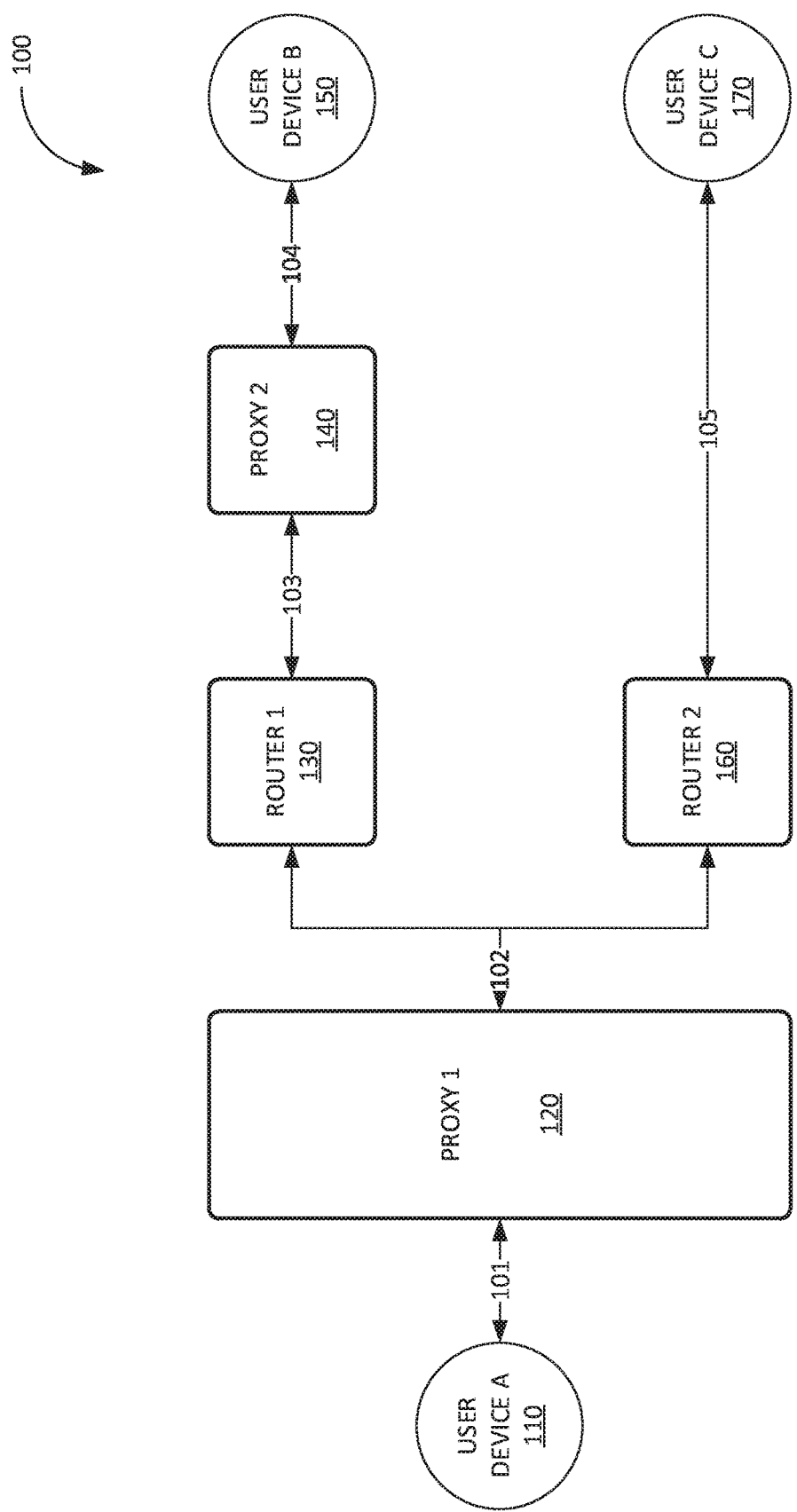
FIG. 1 illustrates a communication system for a session initiation protocol (SIP) communication according to one implementation.

FIG. 1 illustrates a communication system 100 for a session initiation protocol (SIP) communication according to one implementation. In this example embodiment communication system 100 includes User Device A 110, Proxy 1 120, Router 1 130, Router 2 160, Proxy 2 140, User Device B 150, and User Device C 170. User Device A 110 communicates with Proxy 1 120 over communication link 101. Proxy 1 120 communicates with Router 1 130 and Router 2 160 over communication link 102. Router 1 130 communicates with Proxy 2 140 over communication link 103. Proxy 2 140 communicates with User Device B 150 over communication link 104. Router 2 160 communicates with User Device C 170 over communication link 105.

Although illustrated as a single link between each of the devices illustrated in FIG. 1, it should be understood that multiple communication links may exist between any or all of these devices. For example, Proxy 1 120 and Proxy 2 140 may communicate with Router 1 130, Router 2 160, and User Devices A 110, B 150, and C 170 using multiple internet protocol (IP) addresses.

In operation, User Devices A 110, B 150, and C 170 connect to Proxies 1 120 and 2 140, along with Routers 1 140 and 2 160 to provide desired communications for users of User Devices A 110, B 150, and C 170. These communications may include internet telephony for voice calls and video calls, as well as instant messaging over internet protocol (IP) networks. To provide the communications, Proxies 1 120 and 2 140 are provided to setup and configure the communications between end users using User Devices A 110, B 150, and C 170. Session Managers are hardware devices configured to setup, configure, and transfer communications between the users. In other embodiments, they may alternatively be referred to as proxies, servers, or communication devices. In particular, the session managers may be contacted by an end user device of User Devices A 110, B 150, and C 170 when a communication is required, and the session managers may forward the request to the appropriate destination device.

In this example, Proxy 1 120 may include multiple Internet Protocol (IP) interfaces. In fact, Proxy 1 120 may include both Internet Protocol version 4 (IPv4) interfaces along with Internet Protocol version 6 (IPv6) interfaces. IPv4 requires each interface to have a different IP address, while IPv6 allows the assignment of multiple IP addresses per interface. When communications traverse both IPv4 and IPv6 interfaces and links, addressing of the communications becomes critical and difficult.

Here, to enhance the operation of the multihomed or interface devices, a source address selection algorithm (SASA), defined by the Internet Engineering Task Force (IETF), is applied when a communication is processed by one of the multihomed devices. This SASA algorithm may be defined by RFC 6724 of the IETF, or any other iteration of the RFC that describes a source address selection algorithm. For example, when User Device A 110 requests a communication that is routed User Device B 150 through Proxy 1 120, Router 1 130, and Proxy 2 140, Proxy 1 may apply SASA to identify at least one source address for the proper communication path to User Device B 150.

Using the example of Proxy 1 120 being connected to two routers, wherein each router communicates using a different IP address or addresses with Proxy 1 120, Proxy 1 120 may select a source IP address based on SASA for the desired path to User Device B 150. User Device B 150 then transfers a response to User Device A 110, which may be transferred through Proxy 2 140, indicating a preferred IP address allocated for Proxy 1 120, and User Device A 110 initiates the communication or transfers a second communication request based on the response by User Device B 150.

When User Device A 110 sends a SIP INVITE message to User Device B 150 through Proxy 1 120, it is critical that when Proxy 1 120 forwards the INVITE to Proxy 2 140 through Router 1 130 it determines a source IP address for itself that will allow Proxy 2 140 to send return communications back to Proxy 1 120. Since Proxy 1 120 has multiple IPv4 and IPv6 ports it is not trivial to select the best source address to include in the headers of the SIP INVITE message.

In this example, when Proxy 1 120 receives the INVITE message from User Device A 110, it uses a SASA getsocname( ) function to determine the correct source IP address to include in the Via and Record-Route headers of the INVITE message. The source addresses of the incoming and outgoing connections are obtained from the OS SASA getsocname( ) function, using the IP address of the downstream entity and the IP address of the upstream entity, respectively, as the destination addresses for SASA. As illustrated in detail in FIGS. 2A-2C and 3A-3E, if Proxy 1 120 incorrectly selects an incorrect source address for either the Via or the Record-Route header, the communication will fail.

In another example, Proxy 1 120 checks the source addresses of the inbound connections. If the source address of the inbound connection of the previous hop is different than the source address of the inbound connection of the next hop, it inserts at least two Record-Route headers: first with the source address of the inbound connection from the previous hop and the topmost Record-Route header with the source IP address of the inbound connection from the next hop. This allows both the offeror and answerer to get correct addresses of the proxy to which they send subsequent in-dialog requests RFC6157 does not define how Record-Route header addresses are selected. If the source addresses of the inbound connections are the same, Proxy 1 120 should insert one Record-Route header. This also allows both the offeror and answerer to get correct addresses of the proxy to which they send subsequent in-dialog requests. Also, proxies will use correct addresses to communicate among themselves.

A user device, or a proxy, operating in IPv4 only mode can accept (by passing incoming content through) IPv6 addresses in SIP headers. For example, Proxy 1 can be in IPv4 only mode and pass Proxy 2 an IPv6 address in a Record-Route header. Similarly, a user device operating in IPv6 only mode will accept IPv4 addresses in SIP headers. The user device will include the av.sip.iptolerance feature tag to indicate this fact.

Figure 2A:
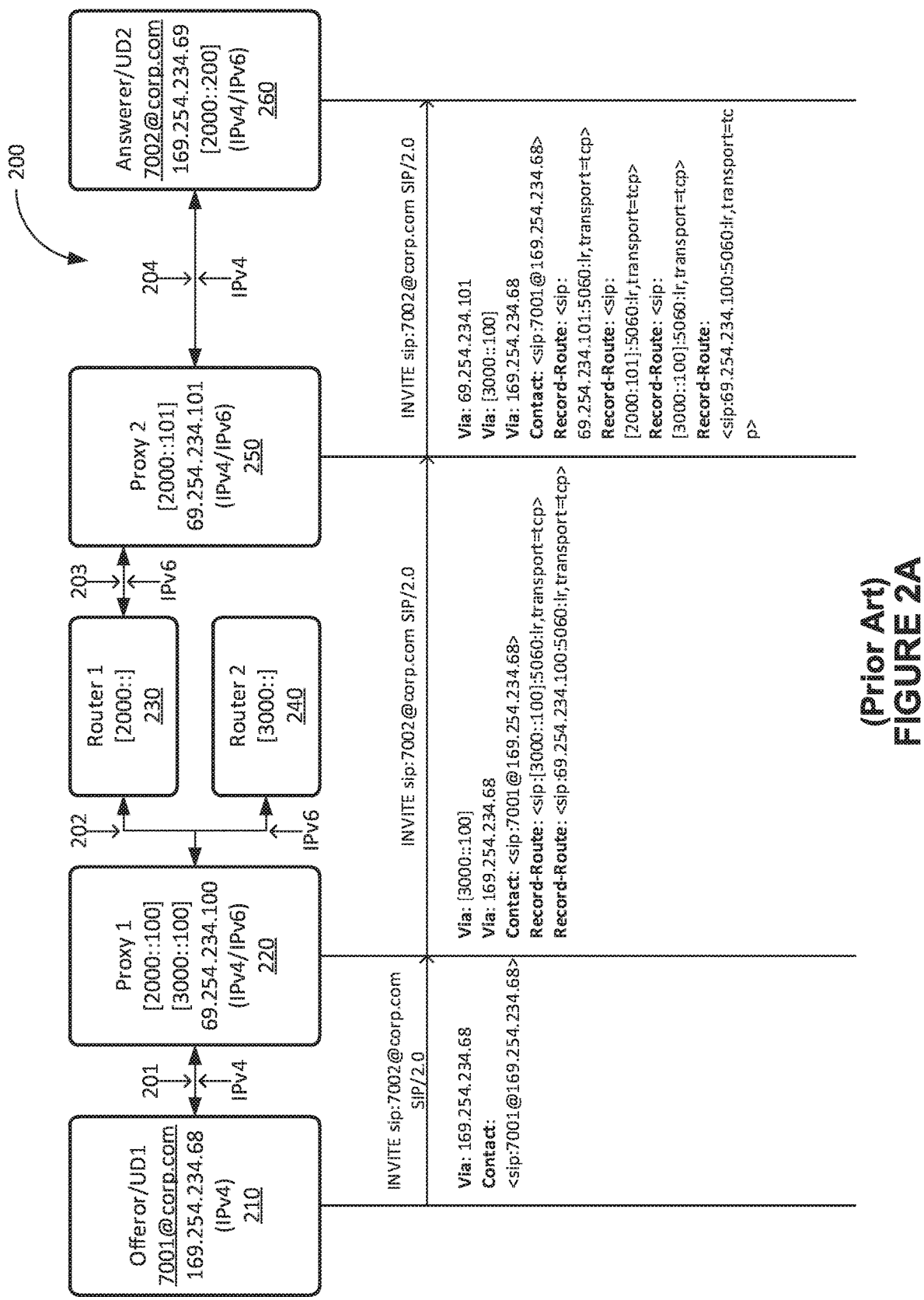

FIGS. 2A-2C illustrate prior art timing diagrams of a method of operating a communication system 200 for SIP communication according to one implementation.

In this example embodiment communication system 200 includes Offeror/User Device 1 210, Proxy 1 220, Router 1 230, Router 2 240, Proxy 2 250, and Answerer/User Device 2 260. The Offeror 210 is an Internet Protocol version 4 (IPv4) device, while Proxy 1 220, Proxy 2 250, and Answerer 260 are all capable of both IPv4 and Internet Protocol version 6 (IPv6) operation. Offeror 210 communicates with Proxy 1 using IPv4 over link 201. Proxy 1 220 communicates with Router 1 230 and Router 2 240 using IPv6 over link 202. Router 1 230 communicates with Proxy 2 250 using IPv6 over link 203. Proxy 2 250 communicates with Answerer 260 using IPv4 over link 204.

Offeror 210 has an Uniform Resource Identifier (URI) address of 7001@corp.com and an IPv4 address of 169.254.234.68. Proxy 1 220 has IPv6 addresses of [2000:: 100] and [3000::100] on link 202, and an IPv4 address of 69.254.234.100 on link 201. Router 1 230 has an IPv6 prefix of [2000::], and Router 2 240 has an IPv6 prefix of [3000::]. Proxy 2 250 has an IPv6 address of [2000::101] on link 203, and an IPv4 address of 69.254.234.101 on link 204. Answerer 260 has an URI address of 7002@corp.com, an IPv6 address of [2000::200], and an IPv4 address of 169.254.234.69 on dual mode link 204.

In this example, Offeror 210 sends a SIP INVITE message to Answerer 260 at the address of 7002@corp.com. This SIP INVITE message is sent to Proxy 1 220 over link 201 and includes a Via header of Via: 169.254.234.68 (the IPv4 address of Offeror 210), and a Contact header of Contact: <sip:7001@169.254.234.68>.

In this prior art example, Proxy 1 220 inserts an incorrect IPv6 Via address in the INVITE message by mistakenly using the address prefix advertised by Router 2 240. When this INVITE message reaches Answerer 260, it responds by sending a 200 OK message back to Offeror 210. However, since Proxy 1 mistakenly inserted a Via address using the prefix of Router 2 240, which is not connected to Proxy 2 250, when Router 1 230 attempts to forward the 200 OK message to Proxy 1, it applies a "Source/Destination Routing" filter and blocks the destination address that uses the prefix advertised by Router 2 240. This example failure of the prior art is illustrated in FIGS. 2A-2C and described in detail below.

Proxy 1 220 forwards the SIP INVITE message to Proxy 2 250 through IPv4 link 201, IPv6 link 202, and Router 1 230, and appends its address information within Via and Record-Route headers within the SIP INVITE message as follows:
Via: [3000::100]
Via: 169.254.234.68
Contact: <sip:7001@169.254.234.68>
Record-Route: <sip:[3000::100]:5060:lr,transport=tcp>
Record-Route: sip:69.254.234.100:5060:lr,transport=tcp
randomly selecting IPv6 address [3000::100].

Note however, that Proxy 1 210 has mistakenly inserted Via and Record-Route headers for Router 2 240 (Via: [3000::100]) and (Record-Route: <sip:[3000::100]:5060:lr, transport=tcp>), while Router 1 230 actually transferred the SIP INVITE to Proxy 2 250.

Proxy 2 250 forwards the SIP INVITE message to Answerer 260 through IPv4 link 204, and appends its address information within Via and Record-Route headers within the SIP INVITE message as follows:
Via: 69.254.234.101
Via: [3000::100]
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>
Record-Route: <sip: [3000::100]:5060:lr,transport=tcp>
Record-Route: <sip:69.254.234.100:5060:lr,transport=tcp>

Referring now to FIG. 2B, Answerer 260 now has a Dialog State as follows:
Local URI=sip:7002@corp.com
Remote URI=sip:7001@corp.com
Remote Target=7001@169.254.234.68
Route Set=
  <sip: 69.254.234.101:5060:lr,transport=tcp>
  <sip: [2000::101]:5060:lr,transport=tcp>
  <sip: [3000::100]:5060:lr,transport=tcp>
  <sip: 69.254.234.100:5060:lr,transport=tcp>

Referring now to FIG. 2C, Answerer 260 attempts to send a SIP 200 OK message back to Offeror 210 through Proxy 2 250 and Proxy 1 220. Answerer 260 sends a SIP 200 OK message to Proxy 2 250 using IPv4 over link 204, including the following headers:
Via: 69.254.234.101
Via: [3000::100]
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>
Record-Route: <sip: [3000::100]:5060:lr,transport=tcp>
Record-Route: <sip: 69.254.234.100:5060:lr,transport=tcp>

When Proxy 2 250 receives this SIP 200 OK message, it strips off the Via and Record-Route headers referring to itself and attempts to forward the SIP 200 OK message to Proxy 1 220, including the following headers:
Via: [3000::100]
Via: 169.254.234.68
Contact: <sip:7001@169.254.234.68>
Record-Route: <sip:[3000::100]:5060:lr,transport=tcp>
Record-Route: <sip: 69.254.234.100:5060:lr,transport=tcp>

However, since Proxy 2 250 is not connected to Router 2 240, the 200 OK message is sent to Router 1 230 (using the top Via [3000::100] address), where Router 1 230 applies a "Source/Destination Routing" filter and blocks the destination address that uses the prefix advertised by Router 2 240. In other words, the communication fails since the Via: [3000::100] header includes the IPv6 address prefix for Router 2 240, instead of Router 1 230, and Router 1 230 filters out the message.

FIGS. 3A-3E illustrate prior art timing diagrams of a method of operating a communication system 300 for SIP communication according to one implementation.

In this example embodiment, communication system 300 includes Offeror/User Device 1 310, Proxy 1 320, Router 1 330, Router 2 340, Proxy 2 350, and Answerer/User Device 2 360. The Offeror 310 is an Internet Protocol version 4 (IPv4) device, while Proxy 1 320, Proxy 2 350, and Answerer 360 are all capable of both IPv4 and Internet Protocol version 6 (IPv6) operation. Offeror 310 communicates with Proxy 1 310 using IPv4 over link 301. Proxy 1 320 communicates with Router 1 330 and Router 2 340 using IPv6 over link 302. Router 1 330 communicates with Proxy 2 350 using IPv6 over link 303. Proxy 2 350 communicates with Answerer 360 using IPv4 over link 304.

Offeror 310 has an URI address of 7001@corp.com and an IPv4 address of 169.254.234.68. Proxy 1 320 has IPv6 addresses of [2000::100] and [3000::100] on link 302, and an IPv4 address of 69.254.234.100 on link 301. Router 1 330 has an IPv6 prefix of [2000::], and Router 2 340 has an IPv6 prefix of [3000::]. Proxy 2 350 has an IPv6 address of [2000::101] on link 303, and an IPv4 address of 69.254.234.101 on link 304. Answerer 360 has an URI address of 7002@corp.com, an IPv6 address of [2000::200], and an IPv4 address of 169.254.234.69 on dual mode link 304.

In this prior art example, Proxy 1 320 inserts an incorrect IPv6 Record-Route address in the INVITE message by randomly using the address prefix advertised by Router 2 340. When this INVITE message reaches Answerer 360, it responds by sending a 200 OK message back to Offeror 310 and the 200 OK is discarded by Router 1 330. Since, in this example, Proxy 1 320 inserted a correct address in the Via header, using the SASA function for the Proxy 2 destination, the 200 OK message reaches Offeror 310.

However, during later communications, when Answerer 360 sends an in-dialog request (RE-INVITE) to Offeror 310, it uses its Route Set (built from the Record-Route headers in the original INVITE) to insert Route headers in the RE-INVITE.

Since Proxy 1 mistakenly inserted a Record-Route address using the prefix of Router 2 340, which is not connected to Proxy 2 350, (and this error was propagated into the Route Set of Answerer 360, and used in the header of a RE-INVITE message), Proxy 2 350 forwards the RE-INVITE to Proxy 1 320 using the IPv6 address provided by Proxy 1 320 in the Record-Route header of the original INVITE. When Router 1 330 attempts to process the RE-INVITE message it applies a "Source/Destination Routing" filter and blocks the destination address that uses the prefix advertised by Router 2 340. This example failure of the prior art is illustrated in FIGS. 3A-3E and described in detail below.

In this example, Offeror 310 sends a SIP INVITE message to Answerer 360 at the address of 7002@corp.com. This SIP INVITE message is sent to Proxy 1 320 over link 301 and includes a Via header of Via: 169.254.234.68 (the IPv4 address of Offeror 310), and a Contact header of Contact: <sip:7001@169.254.234.68>.

Proxy 1 320 forwards the SIP INVITE message to Proxy 2 350 through Router 1 330 and IPv6 links 302 and 303, and appends its address information within Via and Record-Route headers within the SIP INVITE message as follows:
Via: [2000::100]
Via: 169.254.234.68
Contact: <sip:7001@169.254.234.68>
Record-Route: <sip:[3000::100]:5060:lr,transport=tcp>
Record-Route: <sip:69.254.234.100:5060:lr,transport=tcp>

Note that, in contrast to the example of FIGS. 2A-2C, here Proxy 1 320 has correctly inserted a Via header for Router 1 330 (Via: [2000::100]), but still has mistakenly inserted a Record-Route header for Router 2 340 (Record-Route: <sip:[3000::100]:5060:lr,transport=tcp>) into the SIP INVITE message.

Proxy 2 350 forwards the SIP INVITE message to Answerer 360 through IPv4 link 304, and appends its address information within Via and Record-Route headers within the SIP INVITE message as follows:
Via: 69.254.234.101
Via: [2000::100]
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>
Record-Route: <sip: [3000::100]:5060:lr,transport=tcp>
Record-Route: <sip: 69.254.234.100:5060:lr,transport=tcp>

Referring now to FIG. 3B, Answerer 360 now has a Dialog State as follows:
Local URI=sip:7002@corp.com
Remote URI=sip:7001 @corp.com
Remote Target=7001@169.254.234.68
Route Set=
<sip: 69.254.234.101:5060:lr,transport=tcp>
<sip: [2000::101]:5060:lr,transport=tcp>
<sip: [3000::100]:5060:lr,transport=tcp>
<sip: 69.254.234.100:5060:lr,transport=tcp>

Figure 3A:
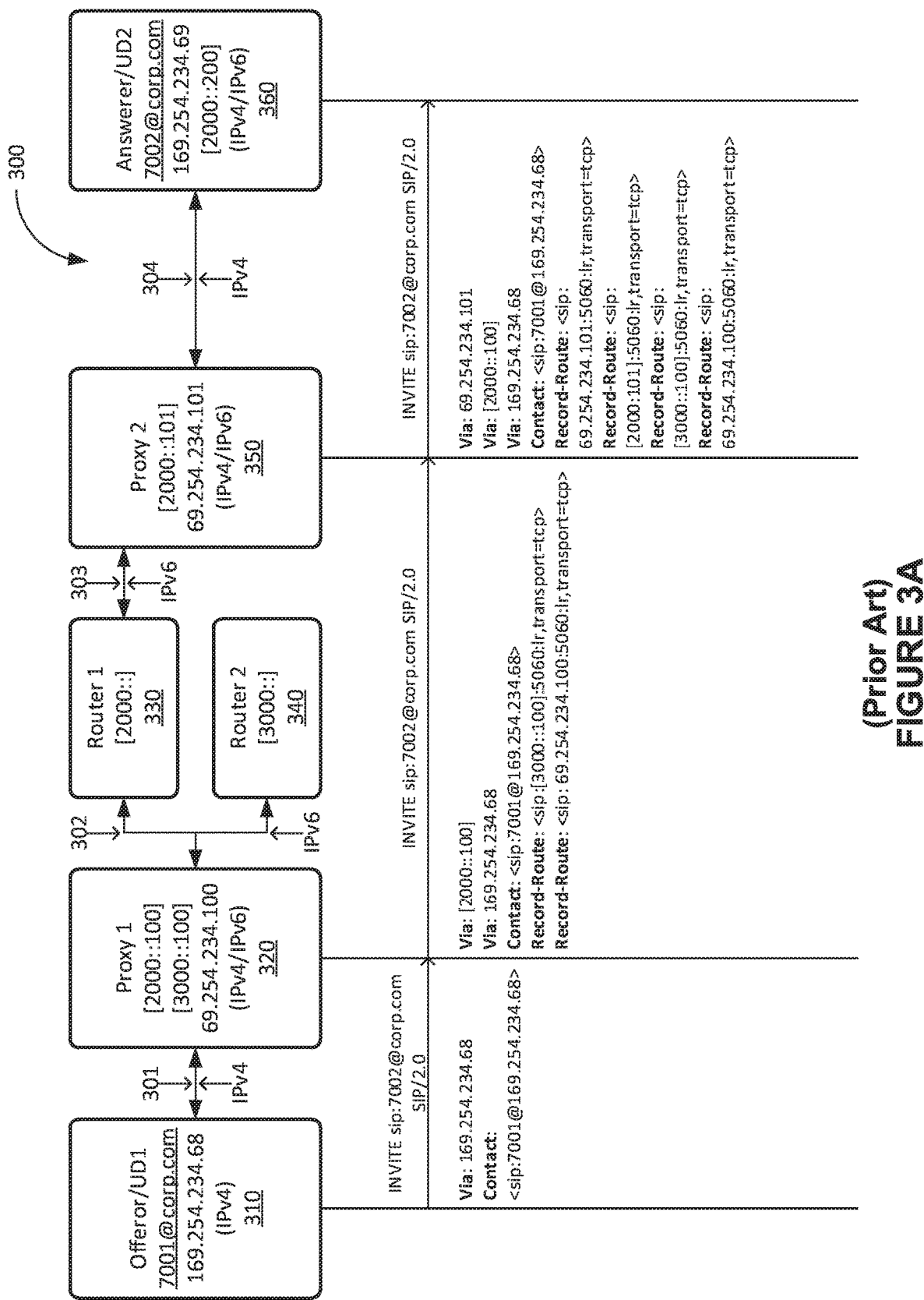
Figure 3C:
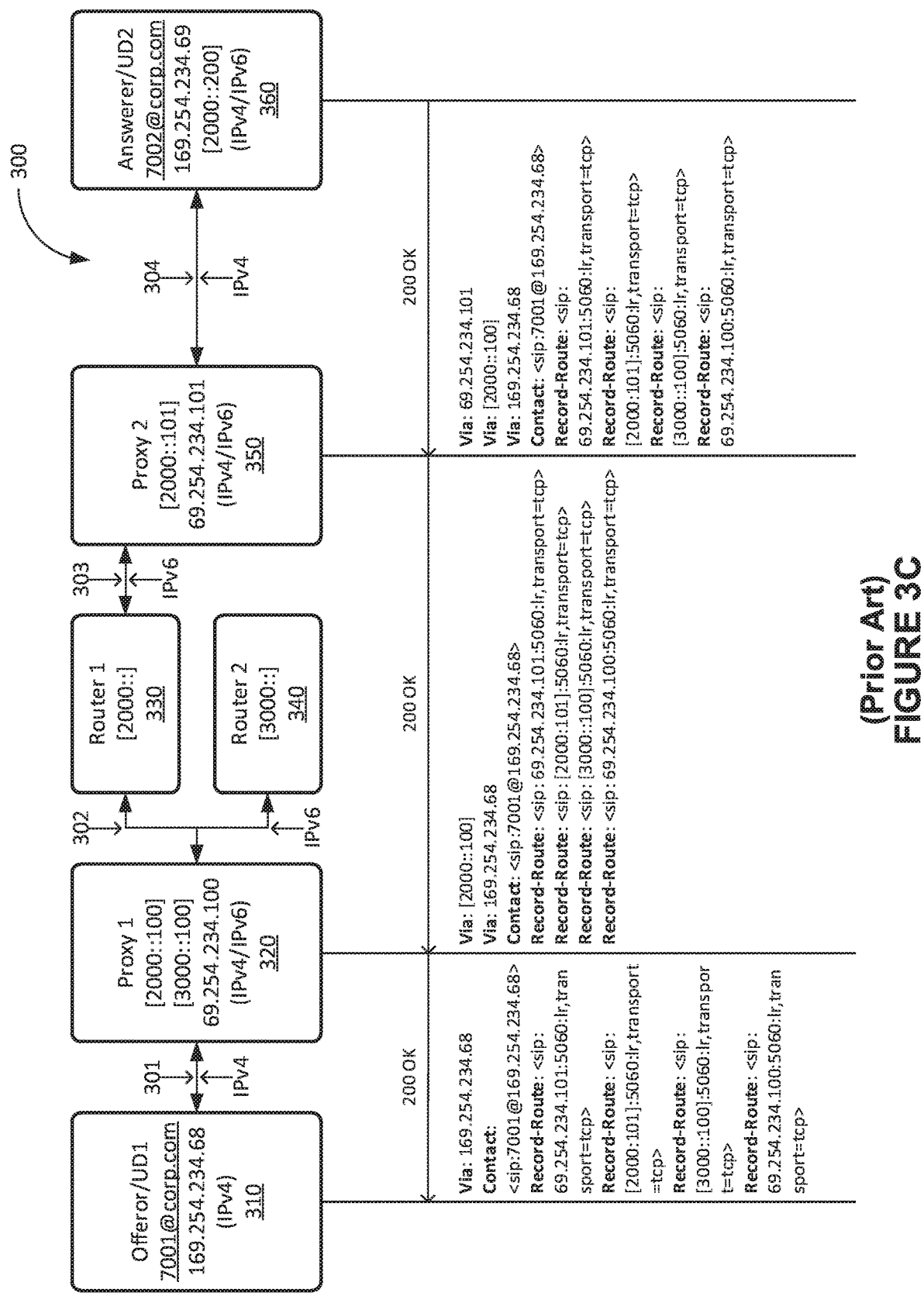

Referring now to FIG. 3C, Answerer 360 sends a SIP 200 OK message back to Offeror 310 through Proxy 2 350 and Proxy 1 320. Answerer 360 sends a SIP 200 OK message to Proxy 2 350 using IPv4 over link 304, including the following headers:
Via: 69.254.234.101
Via: [2000::100]
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>
Record-Route: <sip: [3000::100]:5060:lr,transport=tcp>
Record-Route: <sip: 69.254.234.100:5060:lr,transport=tcp>

When Proxy 2 350 receives this SIP 200 OK message, it strips off the Via and Record-Route headers referring to itself and forwards the SIP 200 OK message to Proxy 1 320, including the following headers:
Via: [2000::100]
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>
Record-Route: <sip: [3000::100]:5060:lr,transport=tcp>
Record-Route: <sip: 69.254.234.100:5060:lr,transport=tcp>

In contrast to the example illustrated in FIGS. 2A-2C, because this SIP 200 OK message has a correct Via header for Router 1 330, Proxy 2 350 successfully transfers the 200 OK message to Proxy 1 320 through Router 1 330. However, this message still has an incorrect Record-Route header referencing Router 2 340.

When Proxy 1 320 receives this SIP 200 OK message, it strips off the Via and Record-Route headers referring to itself and forwards the SIP 200 OK message to Offeror 310, including the following headers:
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>
Record-Route: <sip: [3000::100]:5060:lr,transport=tcp>
Record-Route: <sip: 69.254.234.100:5060:lr,transport=tcp>

Figure 3D:
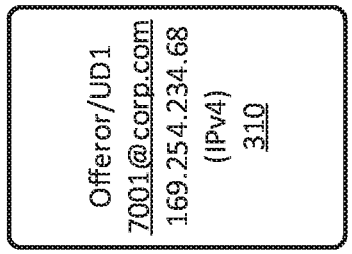

Referring now to FIG. 3D, Offeror 310 now has a Dialog State as follows:
Local URI=sip:7001 @corp.com
Remote URI=sip:7002@corp.com
Remote Target=7002@[2000::200]
Route Set=
<sip: 69.254.234.100:5060:lr,transport=tcp>
<sip: [3000::100]:5060:lr,transport=tcp>
<sip: [2000::101]:5060:lr,transport=tcp>
<sip: 69.254.234.101:5060:lr,transport=tcp>

Referring now to FIG. 3E, when Answerer 360 attempts to send a SIP RE-INVITE message to Offeror 310, it addresses the message to 7001@corp.com and includes the following headers:
Via: 69.254.234.101
Via: [2000::100]
Via: 169.254.234.68
Contact: <sip:7002@169.254.234.69>
Route: <sip: 69.254.234.101:5060:lr,transport=tcp>
Route: <sip: [2000:101]:5060:lr,transport=tcp>
Route: <sip: [3000::100]:5060:lr,transport=tcp>
Route: <sip: 69.254.234.100:5060:lr,transport=tcp>

Note here that Answerer 360 has included a Route header directed to Router 2 340 instead of the correct Route header to Router 1 330. When Proxy 2 350 receives this RE-INVITE message, it strips off the Via and Route headers referring to itself and forwards the RE-INVITE message to Proxy 1 320, including the following headers:
Via: [2000::100]
Via: 169.254.234.68
Contact: <sip:7002@169.254.234.69>
Route: <sip: [3000::100]:5060:lr,transport=tcp>
Route: <sip: 69.254.234.100:5060:lr,transport=tcp>

However, since Proxy 2 350 is not connected to Router 2 340, the RE-INVITE message is sent to Router 1 330, where Router 1 330 applies a "Source/Destination Routing" filter and blocks the destination address that uses the prefix advertised by Router 2 340. In other words, the communication fails since the Route: <sip:[3000::100]:5060:lr, transport=tcp> header includes the IPv6 address prefix for Router 2 340, instead of Router 1 330, and Router 1 330 filters out the message.

FIGS. 4A-4E illustrate timing diagrams of a method of operating a communication system for SIP communication according to one implementation.

In this example embodiment communication system 400 includes Offeror/User Device 1 410, Proxy 1 420, Router 1 430, Router 2 440, Proxy 2 450, and Answerer/User Device 2 460. The Offeror 410 is an Internet Protocol version 4 (IPv4) device, while Proxy 1 420, Proxy 2 450, and Answerer 460 are all capable of both IPv4 and Internet Protocol version 6 (IPv6) operation. Offeror 410 communicates with Proxy 1 420 using IPv4 over link 401. Proxy 1 420 communicates with Router 1 430 and Router 2 440 using IPv6 over link 402. Router 1 430 communicates with Proxy 2 450 using IPv6 over link 403. Proxy 2 450 communicates with Answerer 460 using IPv4 over link 404.

Offeror 410 has an URI address of 7001@corp.com and an IPv4 address of 169.254.234.68. Proxy 1 420 has IPv6 addresses of [2000::100] and [3000::100], and an IPv4 address of 69.254.234.100. Router 1 430 has an IPv6 prefix of [2000::], and Router 2 440 has an IPv6 prefix of [3000::]. Proxy 2 450 has an IPv6 address of [2000::101] and an IPv4 address of 69.254.234.101. Answerer 460 has an URI address of 7002@corp.com, an IPv6 address of [2000::200], and an IPv4 address of 169.254.234.69.

In this example, Offeror 410 sends a SIP INVITE message to Answerer 460 at the address of 7002@corp.com. This SIP INVITE message is sent to Proxy 1 420 over link 401 and includes a Via header of Via: 169.254.234.68 (the IPv4 address of Offeror 410), and a Contact header of Contact: <sip:7001@169.254.234.68>.

In this example embodiment, Proxy 1 420 uses a source address selection algorithm (SASA) getsocname( ) function to determine the proper addresses to incorporate into the Via and Record-Route headers of the INVITE message. Proxy 1 420 forwards the SIP INVITE message to Proxy 2 450 through Router 1 430 and IPv6 links 402 and 403, and appends its address information within Via and Record-Route headers within the SIP INVITE message as follows:
Via: [2000::100]
Via: 169.254.234.68
Contact: <sip:7001@169.254.234.68>
Record-Route: <sip:[2000::100]:5060:lr,transport=tcp>
Record-Route: <sip:69.254.234.100:5060:lr,transport=tcp>

Note that, in contrast to the example of FIGS. 2A-2C and 3A-3E, by using the SASA getsocname( ) function, Proxy 1 420 has correctly inserted a Via header for Router 1 430 (Via: [2000::100]), and has also correctly inserted a Record-Route header for Router 1 440 (Record-Route: <sip:[2000::100]:5060:lr,transport=tcp>) into the SIP INVITE message.

Proxy 1 420 also checks the source addresses of the inbound connections. If the source address of the inbound connection of the previous hop is different than the source address of the inbound connection of the next hop, it inserts at least two Record-Route headers: first with the source address of the inbound connection from the previous hop and the topmost Record-Route header with the source IP address of the inbound connection from the next hop.

When there are two Record-Route headers added, the first Record-Route address is determined by the SASA getsocname( ) function using the Offeror/UD1 410 address as a destination (these two IPs, Offeror/UD1 410 and Proxy 1 420, are in the inbound socket, the socket from Offeror/UD1 410 to Proxy 1 420 on link 401). The second Record-Route address is determined by the SASA getsocname( ) function using the Proxy 2 450 IP address as a destination (these two IPs, Proxy 1 420 and Proxy 2 450 IPs, are in the outbound socket, the socket from Proxy 1 420 to Proxy 2 450 on links 402 and 403).

Proxy 2 450 forwards the SIP INVITE message to Answerer 460 through IPv4 link 404, and appends its address information within Via and Record-Route headers within the SIP INVITE message as follows:
Via: 69.254.234.101
Via: [2000::100]
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>
Record-Route: <sip: [2000::100]:5060:lr,transport=tcp>
Record-Route: <sip: 69.254.234.100:5060:lr,transport=tcp>

Referring now to FIG. 4B, Answerer 460 now has a Dialog State as follows:
Local URI=sip:7002@corp.com
Remote URI=sip:7001 @corp.com
Remote Target=7001@169.254.234.68
Route Set=
<sip: 69.254.234.101:5060:lr,transport=tcp>
<sip: [2000::101]:5060:lr,transport=tcp>
<sip: [2000::100]:5060:lr,transport=tcp>
<sip: 69.254.234.100:5060:lr,transport=tcp>

Figure 4A:
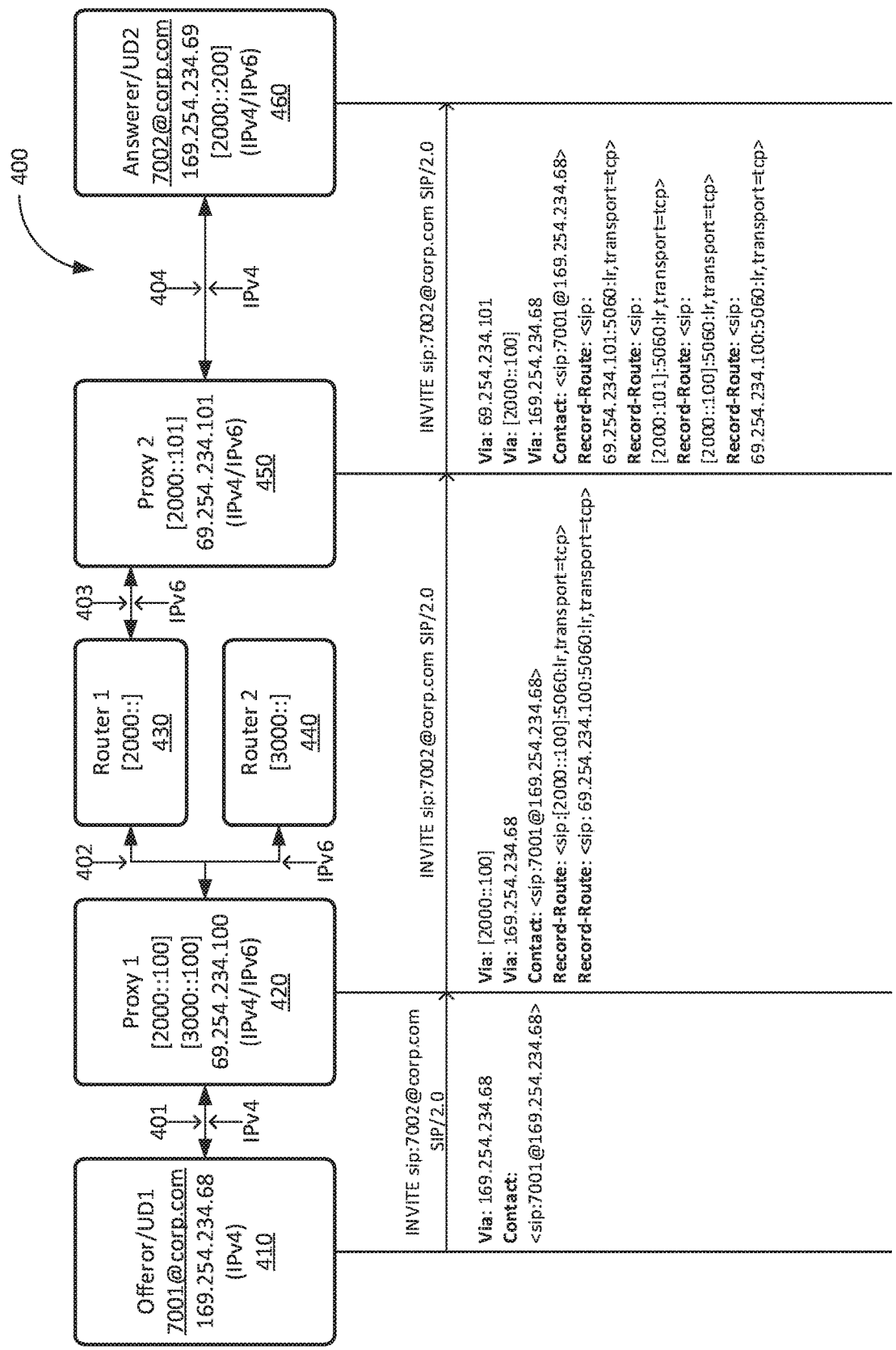
Figure 4C:
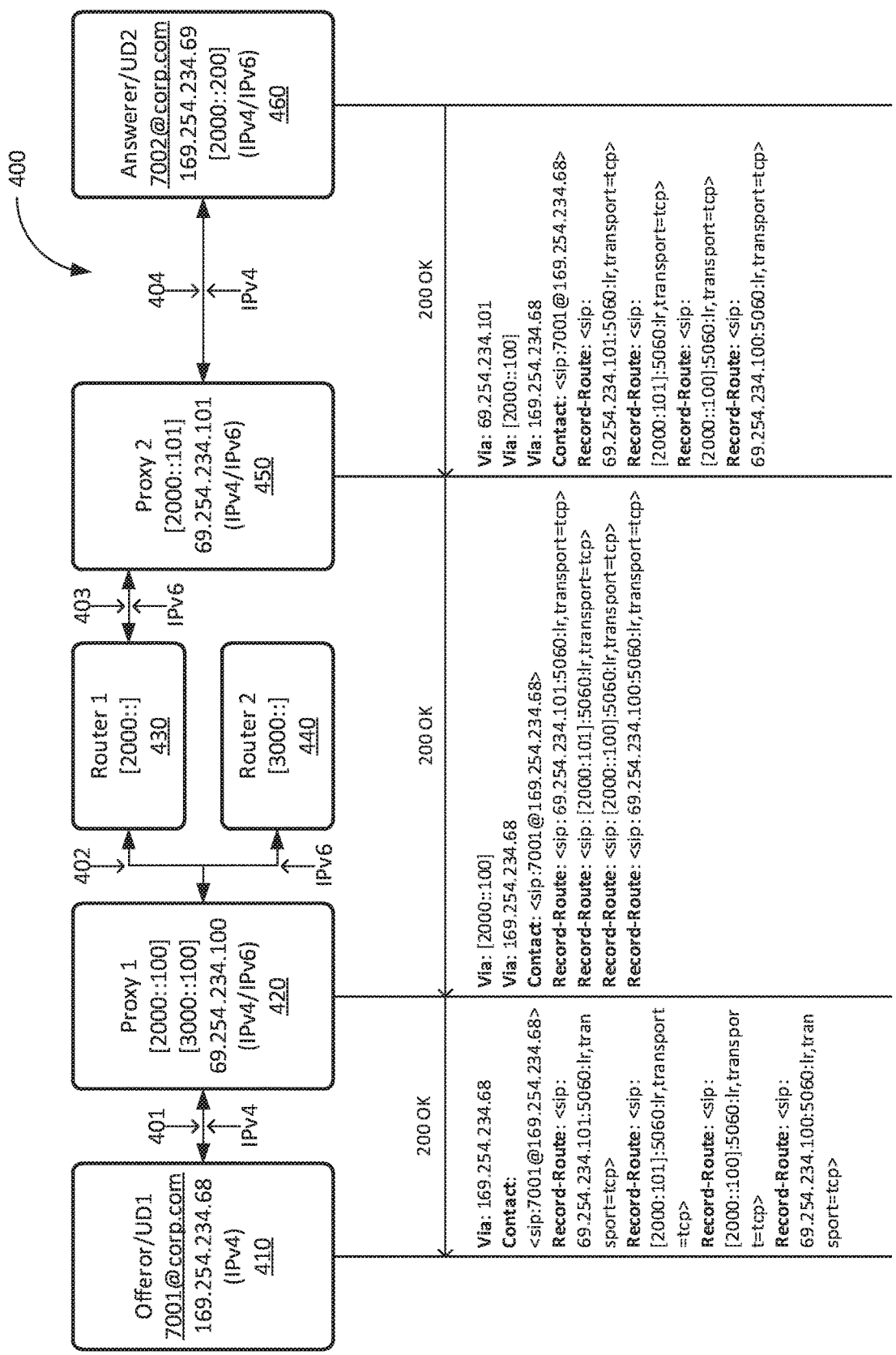

Referring now to FIG. 4C, Answerer 460 sends a SIP 200 OK message back to Offeror 410 through Proxy 2 450 and Proxy 1 420. Answerer 460 sends a SIP 200 OK message to Proxy 2 450 using IPv4 over link 404, including the following headers:
Via: 69.254.234.101
Via: [2000::100]
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>
Record-Route: <sip: [2000::100]:5060:lr,transport=tcp>
Record-Route: <sip: 69.254.234.100:5060:lr,transport=tcp>

When Proxy 2 450 receives this SIP 200 OK message, it strips off the Via and Record-Route headers referring to itself and forwards the SIP 200 OK message to Proxy 1 420, including the following headers:
Via: [2000::100]
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>
Record-Route: <sip: [2000::100]:5060:lr,transport=tcp>
Record-Route: <sip: 69.254.234.100:5060:lr,transport=tcp>

In contrast to the example illustrated in FIGS. 2A-2C and 3A-3E, because this SIP 200 OK message has correct Via and Record-Route headers for Router 1 430, Proxy 2 450 successfully transfers the 200 OK message to Proxy 1 420 through Router 1 430.

When Proxy 1 420 receives this SIP 200 OK message, it strips off the Via and Record-Route headers referring to itself and forwards the SIP 200 OK message to Offeror 410, including the following headers:
Via: 169.254.234.68
Contact: <sip:7001@169.254.234.68>
Record-Route: <sip: 69.254.234.101:5060:lr,transport=tcp>
Record-Route: <sip: [2000:101]:5060:lr,transport=tcp>

Record-Route: <sip: [2000::100]:5060:lr,transport=tcp>
Record-Route: <sip: 69.254.234.100:5060:lr,transport=tcp>

Figure 4D:
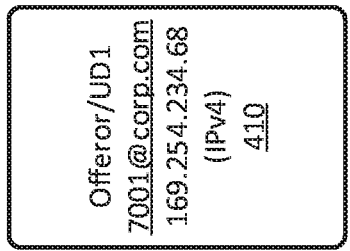

Referring now to FIG. 4D, Offeror 410 now has a Dialog State as follows:
Local URI=sip:7001 @corp.com
Remote URI=sip:7002@corp.com
Remote Target=7002@[2000::200]
Route Set=
<sip: 69.254.234.100:5060:lr,transport=tcp>
<sip: [2000::100]:5060:lr,transport=tcp>
<sip: [2000::101]:5060:lr,transport=tcp>
<sip: 69.254.234.101:5060:lr,transport=tcp>

Figure 4E:
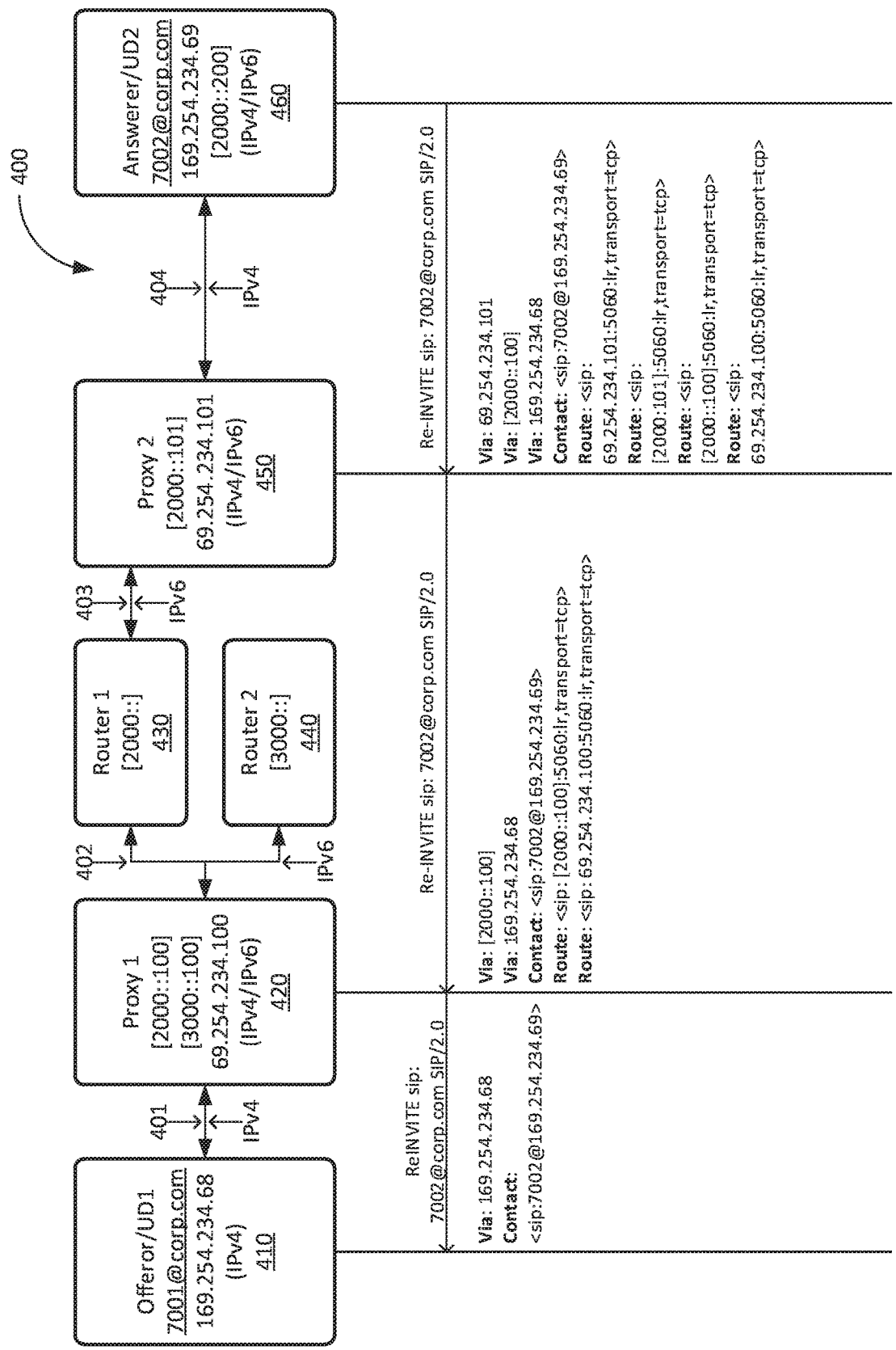

Referring now to FIG. 4E, when Answerer 460 sends a SIP RE-INVITE message to Offeror 410, it addresses the message to 7002@corp.com and includes the following headers:
Via: 69.254.234.101
Via: [2000::100]
Via: 169.254.234.68
Contact: <sip:7002@169.254.234.69>
Route: <sip: 69.254.234.101:5060:lr,transport=tcp>
Route: <sip: [2000:101]:5060:lr,transport=tcp>
Route: <sip: [2000::100]:5060:lr,transport=tcp>
Route: <sip: 69.254.234.100:5060:lr,transport=tcp>

When Proxy 2 450 receives this RE-INVITE message, it strips off the Via and Route headers referring to itself and forwards the RE-INVITE message to Proxy 1 420, including the following headers:
Via: [2000::100]
Via: 169.254.234.68
Contact: <sip:7002@169.254.234.69>
Route: <sip: [2000::100]:5060:lr,transport=tcp>
Route: <sip: 69.254.234.100:5060:lr,transport=tcp>

Since both the Via and Route headers correctly direct communications to Proxy 1 420 through Router 1 430, this RE-INVITE message successfully arrives at Proxy 1 420, where Proxy 1 420 strips of the Via and Route headers referring to itself and forwards the RE-INVITE message to Offeror 410, including the following headers:
Via: 169.254.234.68
Contact: <sip:7002@169.254.234.69>

At this point SIP communication is successfully established between Offeror 410 and Answerer 460 and communication may continue normally.

Figure 5:
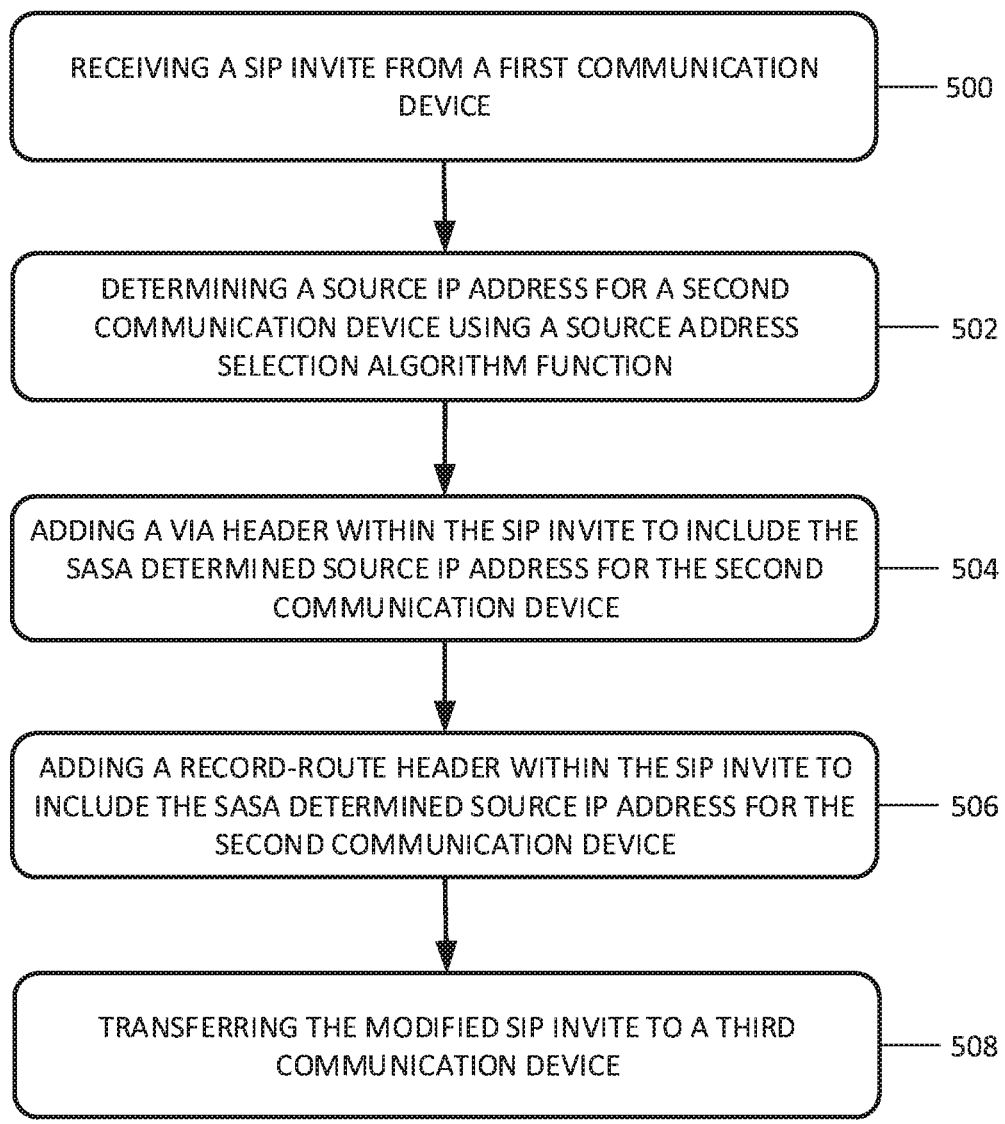
FIG. 5 illustrates a method of operating a communication system for SIP communication according to one implementation.

FIG. 5 illustrates a method of operating a communication system 100 for SIP communication according to one implementation. In this example, a second communication device (Proxy 1 120) receives a SIP invite from a first communication device (User Device A 110), (operation 500). Proxy 1 120 determines its source IP address using a source address selection algorithm (SASA) function as described above with respect to FIG. 1, (operation 502).

Proxy 1 120 adds a Via header to the SIP invite to include its SASA determined source IP address as determined in operation 502, (operation 504). Proxy 1 120 also adds a Record-Route header to the SIP invite to include its SASA determined source IP address as determined in operation 502, (operation 506). Proxy 1 120 then transfers the modified SIP invite to a third communication device (Proxy 2 140), (operation 508).

Note that in some cases two Record-Route headers may be added to the SIP invite in operation 506. Proxy 1 120 checks the source addresses of the inbound connections. If the source address of the inbound connection of the previous hop is different than the source address of the inbound connection of the next hop, it inserts at least two Record-Route headers: first with the source address of the inbound connection from the previous hop and the topmost Record-Route header with the source IP address of the inbound connection from the next hop.

Figure 6:
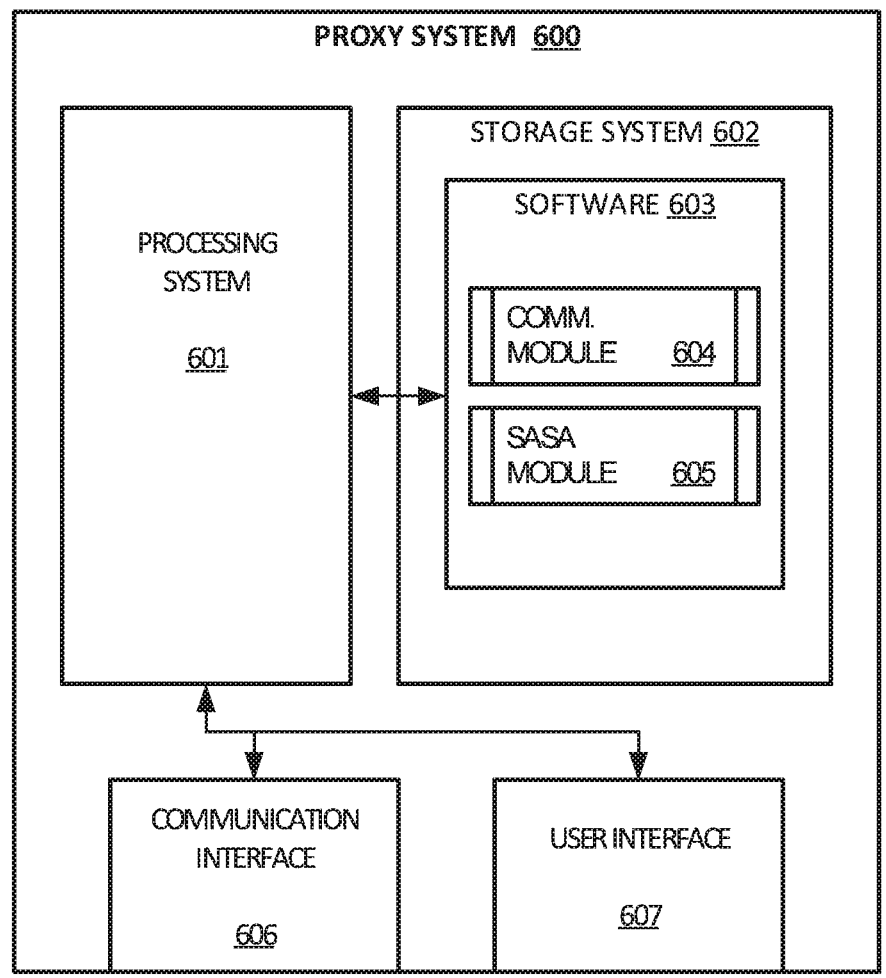
FIG. 6 illustrates a hardware communication device for use in operating a communication system for SIP communication according to one implementation.

FIG. 6 illustrates a hardware communication device 600 for use in operating a communication system 100 for SIP communication according to one implementation. In this example, communication device 600 corresponds to Proxy 1 120 of FIG. 1.

Proxy system 600 is representative of any computing system or systems with which the various operational architectures, processes, scenarios, and sequences disclosed herein for a proxy system, session management system, or other communication device capable of routing SIP messages. Proxy system 600 is an example of Proxy 1 120, Proxy 1 220, Proxy 1 320, and Proxy 1 420, although other examples may exist. Proxy system 600 includes processing system 601, storage system 602, communication interface 606 and user interface 607. Processing system 601 is linked to storage system 602, communication interface 606, and user interface 607. Storage system 602 includes memory devices that store operating software 603.

Communication interface 606 comprises components that communicate over communication links, such as network cards, ports, radio frequency (RF) transceivers, processing circuitry and software, or some other communication devices. Communication interface 606 may be configured to communicate over metallic, wireless, or optical links. Communication interface 606 may be configured to use Time Division Multiplex (TDM), Internet Protocol (IP), Ethernet, optical networking, wireless protocols, communication signaling, or some other communication format—including combinations thereof. In particular, communication interface 601 may be configured with multiple interfaces that permit IP communications with other communication devices using IP signaling.

User interface 607 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 607 may be omitted in some examples.

Processing system 601 comprises a processor and other circuitry that retrieves and executes operating software 603 from storage system 602. The processor may be implemented within a single processing device, but may also be distributed across multiple processing devices or sub-systems that cooperate in executing program instructions. Example processors include general purpose central processing units, application specific processors, and logic devices, as well as any other type of processing device, combinations, or variations. Processing system 601 is typically mounted on a circuit board that may also hold storage system 602 and portions of communication interface 606 and user interface 607.

Storage system 602 may comprise any computer readable storage media readable by processing system 601 and capable of storing software 603. Storage system 602 may include volatile and nonvolatile, removable and non-removable media implemented in any method or technology for storage of information, such as computer readable instructions, data structures, program modules, or other data. Storage system 602 may be independent from or integrated into processing system 601. Storage system 602 can comprise additional elements, such as a memory controller, capable of communicating with processing system 601.

Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 602 may also include communication media over which software 603 may be communicated internally or externally. Storage system 602 may be implemented as a single storage device but may also be implemented across multiple storage devices or sub-systems co-located or distributed relative to each other. Storage system 602 may comprise additional elements capable of communicating with processing system 601 or possibly other systems.

Software 603 may be implemented in program instructions and among other functions and may, when executed by processing system 601, direct processing system 601 to operate as described herein. In particular, the program instructions may include various components or modules that cooperate or otherwise interact to implement at least a portion of proxy system 600. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 603 in the examples comprises computer programs, firmware, or some other form of machine-readable processing instructions. Software 603 may include an operating system, utilities, drivers, network interfaces, applications, virtual machines, or some other type of software. Software 6003 may include additional processes, programs, or components, such as operating system software or other application software. Software 603 may also comprise firmware or some other form of machine-readable processing instructions executable by processing system 601.

In general, software 603, when loaded into processing system 601 and executed, may transform a suitable apparatus, system, or device from a general-purpose computing system into a special-purpose computing system customized to assist in the design of a human-machine interface, among other operations. Indeed, encoding software 603 on the storage system 602 may transform the physical structure of the storage system 602. The specific transformation of the physical structure may depend on various factors in different implementations of this description. Examples of such factors may include, but are not limited to the technology used to implement the storage media of the storage system 602 and whether the computer-storage media are characterized as primary or secondary storage, as well as other factors.

Operating software 603 includes communication module 604 and SASA module 605, although any number of software modules may provide the same operation. Operating software 603 may further include an operating system, utilities, drivers, network interfaces, applications, or some other type of software. When executed by processing system 601, operating software 603 directs processing system 601 to operate proxy system 600 as described herein.

In at least one implementation, communication module 604, when read and executed by processing system 601, directs processing system 601 to identify a communication request (SIP invite) for proxy system 600 to communicate with a second communication device. This communication request may come via communication interface 606, or may come via any similar means. In response to the communication request, SASA module 605 directs processing system 601 to identify a source address for proxy system 600 using a SASA getsocname( ) operation.

After the determination of the source addresses, communication module 604 directs processing system 601 add Via and Record-Route headers to the SIP invite including the source address for proxy system 600, and to transfer the modified SIP invite using communication interface 606 to the second communication device for the communication.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication network utilizing a session initiation protocol (SIP), the method comprising:
   within a second communication device:
      receiving a SIP invite from a first communication device;
      determining a source IP address for the second communication device, using an IP address for a third communication device as a destination address within a source address selection algorithm (SASA) function;
      adding a Via header within the SIP invite to include the SASA determined source IP address for the second communication device;
      adding a Record-Route header within the SIP invite to include the SASA determined source IP address for the second communication device; and
      after adding the Via header and the Record-Route header, transferring the SIP invite to the third communication device.

2. The method of claim 1, wherein adding the Record-Route header within the SIP invite further comprises:
   if a source address of an inbound connection of a previous hop is different from a source address of an inbound connection of a next hop, adding a first Record-Route header within the SIP invite including the source address of the inbound connection of the previous hop and adding a second Record-Route header within the SIP invite including the source address of the inbound connection of the next hop.

3. The method of claim 1, wherein the SASA determined source IP address for the second communication device is an IPv4 IP address or an IPv6 IP address.

4. The method of claim 1, wherein the SASA determined source IP address for the second communication device added to the Via header is determined using a source IP address of an outbound socket to a next hop.

5. The method of claim 1, wherein the SASA determined source IP address for the second communication device is determined using a SASA getsocname( ) function.

6. The method of claim 1, wherein the third communication device is a session manager or proxy in communication with a fourth communication device.

7. The method of claim 1, wherein the source addresses of incoming connections are determined using a SASA getsocname( ) function using an IP address of a downstream entity as the destination address, and the source addresses of outgoing connections are determined using a SASA getsocname( ) function using an IP address of an upstream entity as the destination address.

8. A computing apparatus comprising:
one or more non-transitory computer readable storage media;
a processing system operatively coupled with the one or more non-transitory computer readable storage media;
program instructions stored on the one or more non-transitory computer readable media to operate an end user communication device that, when executed by the processing system, direct the processing system to:
receive a SIP invite from a first communication device;
determine a source IP address for the computing apparatus, using an IP address for a second communication device as a destination address within a source address selection algorithm (SASA) function;
add a Via header within the SIP invite to include the SASA determined source IP address for the computing apparatus;
add a Record-Route header within the SIP invite to include the SASA determined source IP address for the computing apparatus; and
transfer the SIP invite to the second communication device after the Via header and the Record-Route header are added.

9. The computing apparatus of claim 8, wherein add the Record-Route header within the SIP invite further comprises:
if a source address of an inbound connection of a previous hop is different from a source address of an inbound connection of a next hop, add a first Record-Route header within the SIP invite including the source address of the inbound connection of the previous hop and add a second Record-Route header within the SIP invite including the source address of the inbound connection of the next hop.

10. The computing apparatus of claim 8, wherein the SASA determined source IP address for the computing apparatus is an IPv4 IP address or an IPv6 IP address.

11. The computing apparatus of claim 8, wherein the SASA determined source IP address for the second communication device added to the Via header is determined using a source IP address of an outbound socket to a next hop.

12. The computing apparatus of claim 8, wherein the SASA determined source IP address for the computing apparatus is determined using a SASA getsocname( ) function.

13. The computing apparatus of claim 8, wherein the second communication device is a session manager or proxy in communication with a third communication device.

14. The computing apparatus of claim 8, wherein the source addresses of incoming connections are determined using a SASA getsocname( ) function using an IP address of a downstream entity as the destination address, and the source addresses of outgoing connections are determined using a SASA getsocname( ) function using an IP address of an upstream entity as the destination address.

15. A communication system for operating a communication network utilizing a session initiation protocol (SIP) comprising:
a first communication device; and
a second communication device, coupled with the first communication device, wherein the second communication device is configured to:
receive a SIP invite from a first communication device;
determine a source IP address for the second communication device, using an IP address for a third communication device as a destination address within a source address selection algorithm (SASA) function;
add a Via header within the SIP invite to include the SASA determined source IP address for the second communication device;
add a Record-Route header within the SIP invite to include the SASA determined source IP address for the second communication device; and
transfer the SIP invite to the third communication device after the Via header and the Record-Route header are added.

16. The communication system of claim 15, wherein add the Record-Route header within the SIP invite further comprises:
if a source address of an inbound connection of a previous hop is different from a source address of an inbound connection of a next hop, add a first Record-Route header within the SIP invite including the source address of the inbound connection of the previous hop and add a second Record-Route header within the SIP invite including the source address of the inbound connection of the next hop.

17. The communication system of claim 15, wherein the SASA determined source IP address for the second communication device is an IPv4 IP address or an IPv6 IP address.

18. The communication system of claim 15, wherein the SASA determined source IP address for the second communication device added to the Via header is determined using a source IP address of an outbound socket to a next hop.

19. The communication system of claim 15, wherein the SASA determined source IP address for the second communication device is determined using a SASA getsocname( ) function.

20. The communication system of claim 15, wherein the third communication device is a session manager or proxy in communication with a fourth communication device.

* * * * *

UNITED STATES PATENT AND TRADEMARK OFFICE
CERTIFICATE OF CORRECTION

Page 1 of 1

PATENT NO.           : 10,728,207 B2
APPLICATION NO.      : 15/677517
DATED                : July 28, 2020
INVENTOR(S)          : Dusan Mudric It is certified that error appears in the above-identified patent and that said Letters Patent is hereby corrected as shown below:

In the Claims

Column 16, Line 24, in the transfer step of Claim 15, delete "second" and replace with third Signed and Sealed this
Fifteenth Day of February, 2022

Drew Hirshfeld
*Performing the Functions and Duties of the
Under Secretary of Commerce for Intellectual Property and
Director of the United States Patent and Trademark Office*